C. B. LAWRENCE.
COMBINATION TOOL REST.
APPLICATION FILED AUG. 28, 1909.
983,378.
Patented Feb. 7, 1911.
2 SHEETS—SHEET 1.
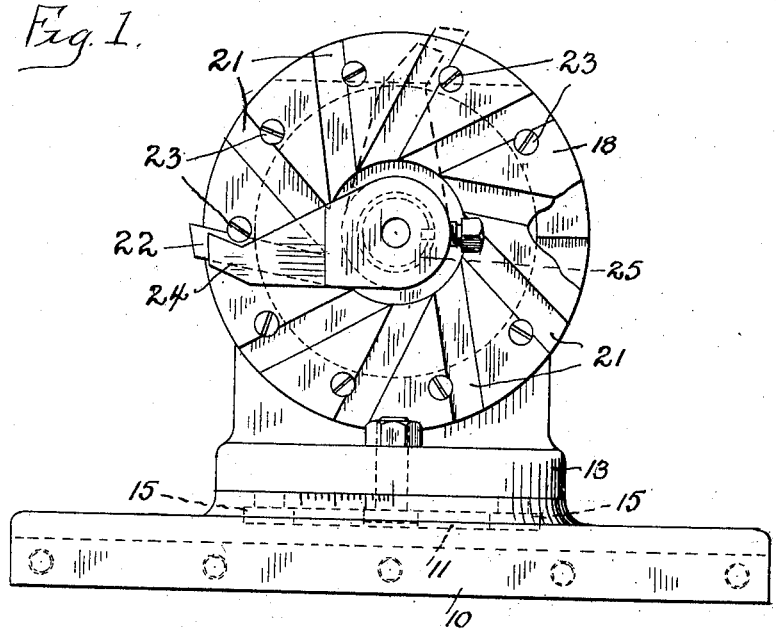
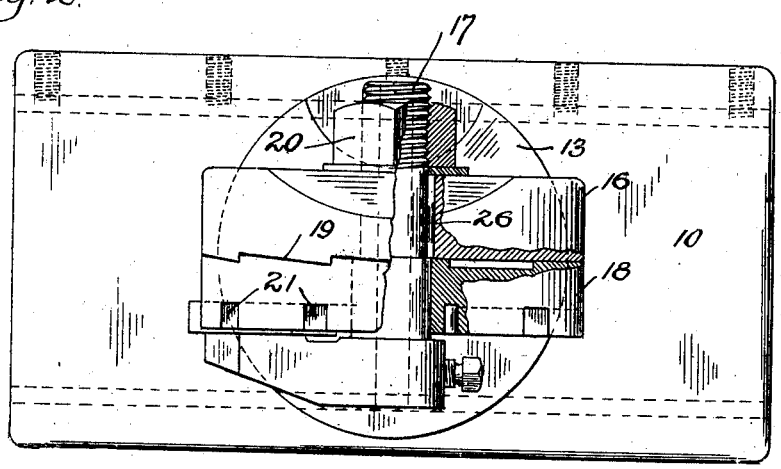
WITNESSES
Ernst P. Wold
S.W. Atherton.
INVENTOR
Charles B. Lawrence
BY
A.W. Wooster
ATTORNEY
THE NORRIS PETERS CO., WASHINGTON, D. C.

C. B. LAWRENCE.
COMBINATION TOOL REST.
APPLICATION FILED AUG. 28, 1909.
983,378.
Patented Feb. 7, 1911.
2 SHEETS—SHEET 2.
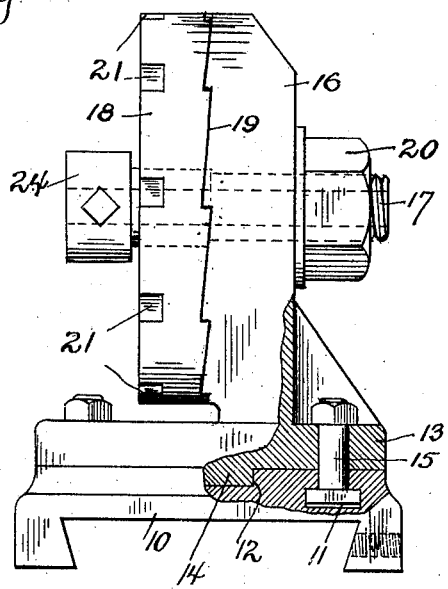
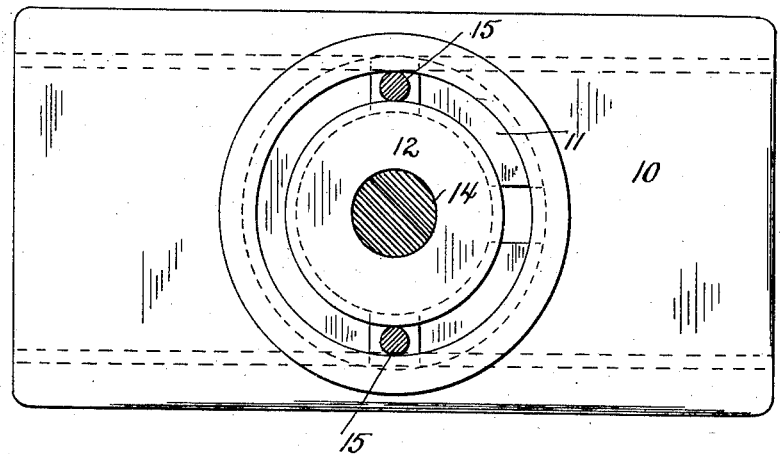
WITNESSES
INVENTOR
Charles B. Lawrence
BY
ATTORNEY

UNITED STATES PATENT OFFICE.

CHARLES B. LAWRENCE, OF TORRINGTON, CONNECTICUT.

COMBINATION TOOL-REST.

983,378. Specification of Letters Patent. Patented Feb. 7, 1911.

Application filed August 28, 1909. Serial No. 515,090.

*To all whom it may concern:*

Be it known that I, CHARLES B. LAWRENCE, a citizen of the United States, residing at Torrington, in the county of Litchfield, State of Connecticut, have invented certain new and useful Improvements in Combination Tool-Rests, of which the following is a specification.

This invention relates to certain new and useful improvements in tool rests.

The invention has for its object to provide an improved tool post constructed to hold a number of cutting or boring tools, so arranged that any tool which may be selected, may be brought into proper position for use.

A further object is to provide improved means for supporting the tools.

A further object is to provide improved means for adjusting the tool rest and post in accordance with the character of the work to be performed by the various tools.

The invention will be hereinafter fully set forth and particularly pointed out in the claims.

In the accompanying drawings:—Figure 1 is a side elevation illustrating my improved tool rest. Fig. 2 is a top plan view, parts being in section. Fig. 3 is an edge view with parts shown in section. Fig. 4 is a transverse sectional view.

Referring to the drawing, 10 designates a slide or stationary standard provided with a circular undercut groove 11 and a central circular recess 12. Resting upon the slide or standard 10 is a base 13 provided with a central stud 14 fitting within the recess 12, and held against rotary movement by means of bolts 15, the heads of which are located within the groove 11. By loosening the nuts or bolts 15, the base 13 may be rotated to any desired position. In order to aid in the rotary adjustment the meeting edges of the slide 10 at base 13 may be graduated. The base 13 is provided with an upwardly extended circular head 16 in which is mounted a bolt 17 which in turn rotatably supports a tool head 18. The stationary head 16 and the tool head 18 are provided with inclined teeth 19 which engage and normally prevent the rotation of the head 18 when the nut 20 has been screwed home. The tool head 18 is provided with a plurality of recesses 21 extending from the center to the periphery thereof and each adapted to hold a tool 22 of any suitable or preferred type, said tools being normally held stationary by means of screws 23 which engage the exposed faces of the tools. Mounted on the end of the bolt 17 adjacent the grooved face of the head 18 is a stud 24 adapted to hold the tools 22 when they are to be employed. This stud is held in position by any suitable means, such as a set screw and is slabbed as indicated at 25 to prevent rotation of the stud while tightening nut 20, and the bolt 17 is held against rotation by means of a key 26 or similar device.

In practice when it is desired to use a tool the nut 20 is loosened and the head 18 rotated to bring the desired tool into the proper position. When my improved combination tool rest is to be used on a planer or shaper, or other machine tool, the stud is revolved a quarter turn as indicated in dotted lines, Fig. 1. For other work the stud is held in the position indicated in full lines Fig. 1. It will be observed that the base 13 may also be shifted to bring the tool into different positions with relation to the work.

I claim as my invention:—

1. A combination tool rest comprising a support provided with a stationary head, a bolt supported by said head, a tool carrying head rotatably mounted on said bolt and provided with a plurality of tool receptacles, means for independently securing tools in said receptacles, a radial arm secured to said bolt, and means for clamping said arm against said tool carrying head and over the receptacle containing the tool to be used, whereby the clamping pressure is brought directly against said tool, the remaining receptacles being exposed.

2. A combination tool rest comprising a support provided with a stationary head, a bolt supported by said head, a tool carrying head rotatably mounted on said bolt and provided with a plurality of tool receptacles, means for independently securing tools in said receptacles, a radial arm mounted to rotate on said bolt, means for locking said arm and bolt against relative movement, and means for clamping said arm against said tool carrying head and over the receptacle containing the tool to be used, whereby the clamping pressure is brought directly against said tool, the remaining receptacles being exposed.

CHARLES B. LAWRENCE.

Witnesses:
　THOMAS J. NALL,
　MABEL C. CALLENDER.